Figure 2:
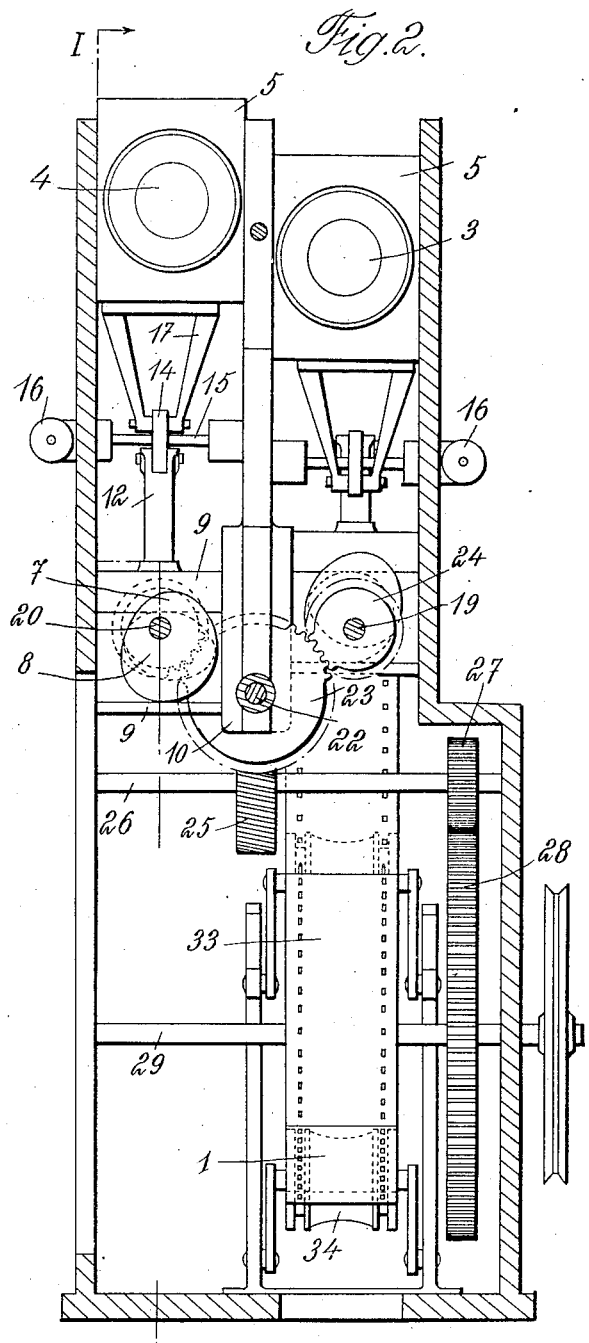

D. BOIXEDA.
MOVING PICTURE APPARATUS.
APPLICATION FILED MAY 22, 1917.
1,336,996.
Patented Apr. 13, 1920.
3 SHEETS—SHEET 1.
Fig. 1.
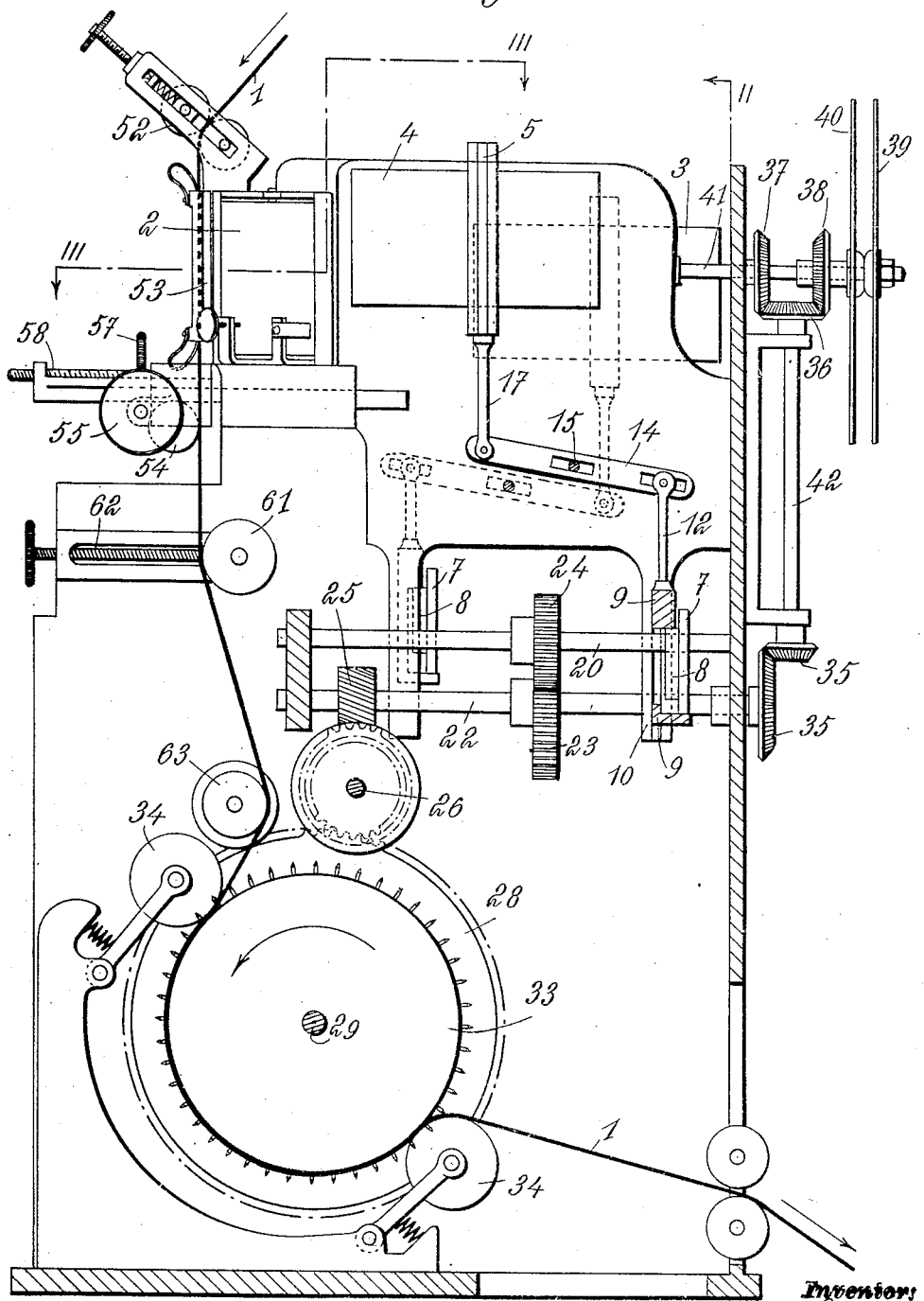
Inventor:
Daniel Boixeda
per H. W. Plucker
Attorney.

D. BOIXEDA.
MOVING PICTURE APPARATUS.
APPLICATION FILED MAY 22, 1917.

1,336,996.

Patented Apr. 13, 1920.
3 SHEETS—SHEET 3.

Inventor:
Daniel Boixeda
per H. W. Plucker
Attorney.

UNITED STATES PATENT OFFICE.

DANIEL BOIXEDA, OF BARCELONA, SPAIN.

MOVING-PICTURE APPARATUS.

1,336,996.   Specification of Letters Patent.   Patented Apr. 13, 1920.

Application filed May 22, 1917. Serial No. 170,208.

*To all whom it may concern:*

Be it known that I, DANIEL BOIXEDA, a subject of the King of Spain, residing at Barcelona, Kingdom of Spain, have invented certain new and useful Improvements in Moving-Picture Apparatus, of which the following is a specification.

My invention relates to moving picture apparatus and specially to those intended for the projection of moving pictures, although it can also be applied to apparatus adapted to take moving pictures.

The object of my invention is to obtain a moving picture apparatus in which the film moves in a continuous and steady movement thereby removing the defect of the usual apparatus in which the film moves intermittently.

Another object of my invention is to prevent the flickering that occurs with the usual moving picture apparatus, owing to the obturations of the objective, that is to say to the intervals during which the objective remains shut and therefore the screen remains dark.

In the usual moving picture apparatus the film has an intermittent movement imparted in such a manner that at the moment that a picture is in line with the objective, the film stops, the shutter opens and the picture is projected during a fraction of a second, then the shutter is shut and the film moves again till the next picture is in line with the objective, the same operations being then repeated. This requires a complication in the mechanism that moves the film and causes the quick wearing out of the film.

It is a fact already known that a picture can be projected when in movement, so that the projected view appears fixed on the screen provided that a certain movement is transmitted to the objective that keeps the proper relation with the movement of the object. Applying this principle to a moving picture apparatus it is not necessary to interrupt the movement of the film while each one of the views is projected or is taken, but the view can be projected or taken while the film moves, provided that the proper movement is given to the objective. This movement of the objective has to be effected parallel to the film and the relation between the speed of the objective and the speed of the film has to be the same as the relation existing between the distance from the objective to the projecting screen or to the object and the distance between the film and projecting screen or object.

My invention consists in combining in a moving picture apparatus, an objective mounted on guides with a reciprocating movement parallel to the film in such a way that while the shutter remains open the objective moves following the movement of the film and with the corresponding speed to project on the screen a fixed image of one of the pictures of the film and at the moment that the shutter is closed the objective draws back until it is in line with the next picture and so on.

To prevent the flickering produced in the usual apparatus by the intervals in which the screen remains dark, I combine in my apparatus two objectives close together and parallel to each other with means to duplicate the picture on the film so that it can be projected simultaneously by both objectives and besides I combine the movements of the shutter and of the objectives in such a way that these are never closed simultaneously but while one of them is moving backward and therefore is closed the other is still moving forward and therefore remains still open.

Figure 3:
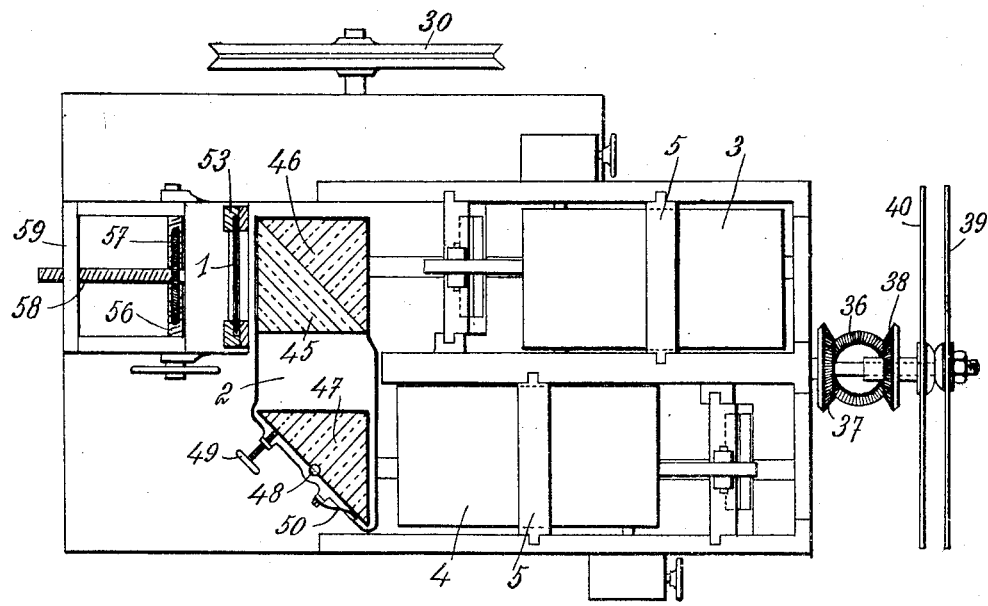
Figure 4:
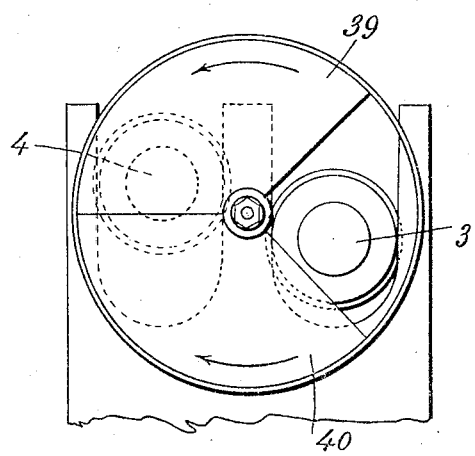

In describing my invention in detail, reference will be had to the accompanying drawings, wherein like symbols refer to like or corresponding parts throughout the several views and in which:

Figure 1 is a vertical section of the apparatus on the line I of Fig. 2; Fig. 2 is another section on the line II of Fig. 1; Fig. 3 is a top front view, partly in section on the line III of Fig. 1 and Fig. 4 is a detail view of the shutter.

The film 1 is moved with a continuous and steady movement by the drum 33. A set of glass prisms 2 is adapted to duplicate the picture on the film, some of the light rays passing through the film being directed through the objective 3 in line therewith while some of the rays are subjected to a double reflection and directed through the objective 4, the arrangement being such that both objectives can project simultaneously the picture of the film 1.

The two objectives 3 and 4 are mounted on respective frames 5 slidable vertically on guides provided in the frame of the apparatus and have a reciprocating movement controlled in such a manner that when the shutter is open the objective follows the movement of the film and with a speed in relation with the speed of the film and while the shutter is closed the objective draws back to face the next picture of the film. In this manner each one of the objectives projects on the screen a fixed picture although the film is running during this projection.

The objectives receive their reciprocating movement from a pair of eccentric wheels or cams 7 and 8 fixed on the shafts 19 and 20. These eccentrics 7 and 8 are combined with a frame 9 slidable vertically on guides 10 and disposed in such a way that the eccentric 7 acts on the lower part of this frame to give it a downward movement and the eccentric 8 acts on the upper part to give it the upward movement.

These eccentrics are shaped so as to obtain a steady speed in the downward movement of the objective and keep a certain relation with the speed of the film. The movement of the frame 9 is transmitted to the frame 5 that carries the objective by means of the stem 12, lever 14 and stem 17. The shaft 15 of the lever 14 can be moved parallel to itself forward or backward by means of the screw 16 in order to change the relation between the two arms of the lever and adjust properly the stroke of the objective. In this way when it is necessary to replace the objectives by others of different focus it is not necessary to change the eccentrics 7 and 8 but it is sufficient to gage the position of the shaft 15 so that the stroke of the objectives be in due relation with the distance of same from the screen so that the picture projected on this screen is fixed.

The shafts 19 and 20 receive movement by means of gears 24 and 23 on the central shaft 22 which is moved by the main shaft 29 by means of the gears 27 and 28, the shaft 26 and the two helical gears 25. The shaft 29 is rotated by the driving pulley 30 and carries the drum 33 that transmits movement to the film 1 which fits exactly on this drum 33 by the action of the two pressure rollers 34. This drum 33 may be provided with teeth as represented in the drawing to gear with the holes of the film or it may be smooth provided there are a sufficient number of pressure rollers to prevent the film from creeping on the drum.

The eccentrics 7 and 8 mounted on the shafts 19 and 20 are keyed at different angles on their respective shafts; so that notwithstanding both objectives 3 and 4 have identical movements the movement of one of them is advanced in relation to that of the other. Therefore when one of the objectives is moving upward the other is still moving downward and as the shutter covers the objectives alternately during their upward stroke, it follows that when one of the objectives is shut the other remains open and the projection on the screen is never interrupted. In this manner the flickering of the usual moving picture apparatus is completely prevented.

The shutter employed in this apparatus to obtain this result, consists of two sectors 39 and 40 disposed in parallel planes, mounted both on a common shaft 41 and adapted to rotate with equal speeds but in opposite direction. Rotary motion is transmitted thereto by means of a shaft 42 driven by shaft 22 by means of a pair of bevel gears 35 and provided at its upper end with another bevel gear 36 that meshes simultaneously with two gears 37 and 38 mounted on the shaft 41. The gear 38 is fixed on a sleeve loose on the shaft 41 and which carries the sector 40 while the gear 37 is fixed on the shaft 41 to the end of which is secured the other sector 39. By this combined movement of the two sectors it is possible to obtain the closing of the objectives in the above conditions.

To produce the unfolding of the picture to be projected by the two objectives a set of optical prisms consisting of the two prisms 45 and 46 are disposed in such manner that in the union face of them a partial reflection of the light rays coming from the film is produced, so that a part of these rays goes through the prism 46 to the objective 3 and another part is reflected toward the other prism 47 in which another reflection of the light rays is produced that directs them to the objective 4. In this manner the picture of the film 1 is simultaneously projected by the two objectives 3 and 4. As these objectives 3 and 4 are mounted parallel one to the other and separated by a certain distance, the pictures projected by both objectives on the screen will not fit exactly and to prevent this defect the prism 47 is mounted to oscillate around the pivots 48 and by means of a screw 49 a slight inclination can be given to it to obtain the superposition of the pictures. A spring 50 secures the position of the prism forcing it to always fit against the screw 49.

To obtain this result there could also be employed a mirror instead of a prism 47 and a transparent glass plate instead of the prisms 45 and 46 which would also reflect a part of the light rays while allowing the other part to go through.

To focus the picture projected on the screen instead of changing the position of the objectives, the film can be moved nearer or farther from them. To effect this the guide 53 of the film together with the pressure rollers 52 and the guiding roller 54 are mounted on a slide that can move toward or away from the box of prisms 2. This movement is transmitted by means of a button 55 that carries a worm gear 56 which moves a toothed wheel 57 fixed on a spindle 58 in threaded engagement with the cross bar 59 of the frame of the apparatus.

To center the picture, that is to say, to obtain that each picture of the film fits exactly with the screen a tension roller 61 is provided that can be moved by hand by means of a threaded spindle 62. In this manner the length of the film between the guiding rollers 54 and 63 can be increased or decreased to change the position of the picture of the film in relation with the axes of the objectives so that the picture is properly positioned on the screen.

I have shown and described preferred and satisfactory constructions, but desire it to be understood that slight changes may be made therein without departing from the spirit and scope of my invention, provided such changes fall within the scope of the appended claims.

I claim:

1. In a moving picture apparatus the combination of means for continuously moving a film, two objectives arranged side by side, means between the film and said objectives for allowing light rays to pass through the film and one of said objectives in a rectilinear direction while causing light rays to pass through the film and the other objective along a broken path, means for reciprocating said objectives, and shutters adapted to expose said objectives alternately.

2. In a moving picture apparatus the combination of means for continuously moving a film, guiding means for the film, two objectives arranged side by side, means for adjusting said guiding means in position with respect to said objectives, means between the film and said objectives for allowing light rays to pass through the film and one of said objectives in a rectilinear direction while causing light rays to pass through the film and the other objective along a broken path, means for varying the direction of said broken path, means for reciprocating said objectives, said reciprocating means including rocking levers and adjustable pivots for said levers, and shutters adapted to expose said objectives alternately.

3. In a moving picture apparatus, the combination of means for continuously moving a film, an objective movable in a direction parallel to the film, means for reciprocating said objective comprising a shaft, means for rotating said shaft at a speed proportionate to the speed of the film, a cam on the shaft for moving the objective in the same direction as the film and at a uniform velocity, a second cam on the same shaft for effecting the return movement of the objective, and a shutter adapted to open the objective while it is moving at a uniform velocity in synchronism with the film and to close the objective while it is returning to its initial position.

4. In a moving picture apparatus the combination of means for continuously moving a film, two objectives arranged side by side, means between the film and said objectives whereby a picture on the film is simultaneously projected by both objectives, means for reciprocating said objectives in a direction parallel to the film, said means comprising two parallel shafts, means for rotating said shafts and a pair of cams on each of said shafts, one cam of each pair being adapted to move said objectives in synchronism with the film and the other cam of each pair being adapted to return the objectives to their initial positions, the arrangement of the cams being such that the two objectives move in opposite directions, and a shutter adapted alternately to open each objective as it is moved in synchronism with the film and close each objective as it is returned to its initial position.

5. In a moving picture apparatus the combination of means for continuously moving a film, guiding means for the film, two objectives arranged side by side, a set of prisms interposed between said guiding means and said objectives, said prisms being so arranged that a picture on the film is simultaneously projected by both objectives, means for adjusting said guiding means in position with respect to said objectives, means for reciprocating said objectives in a direction parallel to the film, said means comprising two parallel shafts, means for rotating said shafts and a pair of cams on each of said shafts, one cam of each pair being adapted to move said objectives in synchronism with the film and the other cam of each pair being adapted to return the objectives to their initial positions, the arrangement of the cams being such that the two objectives reciprocate in opposite directions, means for varying the stroke of each objective independently of its controlling cams, and a shutter adapted alternately to open each objective as it is moved in synchronism with the film and close each objective as it is returned to its initial position.

6. In a moving picture apparatus means for continuously moving a film, two objectives arranged side by side, means between the film and said objectives whereby a picture on the film is simultaneously projected by both objectives, means for obtaining coincidence of the images projected by the objectives on a screen, means for reciprocating said objectives in a direction parallel to the film, said means including alternately operative means for moving each objective in synchronism with the film and for returning each objective to its initial position, a shutter comprising two co-axial sectors, and means for rotating said sectors in opposite directions, the arrangement being such that each objective is uncovered while it is moved in synchronism with the film.

In testimony whereof I affix my signature.

DANIEL BOIXEDA.